United States Patent [19]

Beneteau

[11] Patent Number: 4,504,725
[45] Date of Patent: Mar. 12, 1985

[54] RESISTANCE WELDING APPARATUS WITH COMPOUND ELECTRODE HOLDER

[76] Inventor: Donald J. Beneteau, 1333 Front Rd. South, Amherstburg, Ontario, Canada

[21] Appl. No.: 558,804

[22] Filed: Dec. 7, 1983

Related U.S. Application Data

[63] Continuation-in-part of Ser. No. 545,477, Oct. 26, 1983.

[51] Int. Cl.³ ............................................. B23K 11/30
[52] U.S. Cl. .................................. 219/86.25; 219/89
[58] Field of Search ............. 219/89, 90, 86.25, 86.33

[56] References Cited

U.S. PATENT DOCUMENTS 2,879,374  3/1959  Seeloff ................................. 219/89
4,410,782 10/1983  Konno et al. ......................... 219/89
4,458,131  7/1984  Challenger ........................... 219/90

Primary Examiner—Clifford C. Shaw
Attorney, Agent, or Firm—Allen D. Gutchess, Jr.

[57] ABSTRACT

Resistance welding apparatus with a compound electrode holder is provided. The apparatus is more effective in resistance welding members of U-shaped cross section than apparatus heretofore known. The compound electrode holder enables its electrode to travel in one arcuate path throughout most of its travel or stroke and to move in a second arcuate path as it approaches the workpiece. The compound electrode holder achieves a large path of travel of its electrode and at the same time accurate alignment of the electrodes and reliable welds are attained.

20 Claims, 4 Drawing Figures

RESISTANCE WELDING APPARATUS WITH COMPOUND ELECTRODE HOLDER

This application is a continuation-in-part of my copending application Ser. No. 545,477 filed on Oct. 26, 1983.

This invention relates to resistance welding apparatus having a compound electrode holder.

When electrodes have required long travel or strokes, such as when welding members of deep U-shaped cross section, "C" type electrode holders heretofore have generally been used. These require considerable height to accommodate the length of travel, and also considerable size and weight to accomplish proper rigidity for accurate electrode alignment. The "C" type electrode holders also have required long laminated shunts or cables to accommodate stroke length and these have a tendency to self destruct due to the inductive kick. The long shunts or cables also produce large secondary loops resulting in large electrical losses. Consequently, a much larger transformer is required and poor weld quality also results due to the fact that the secondary loop varies since the shunt or cable never bends exactly the same from weld to weld.

Scissors-type electrode holders have not been satisfactory for welding members of deep U-shaped cross section because the arcuate path of the electrodes is insufficient to clear the members to be welded so that the welded member can be moved and a new member to be welded can be placed in welding position. If the scissors-type electrode holders are sufficiently long, a desired path of travel may be obtained, but then many of the same disadvantages encountered with C-type electrode holders again result.

A compound electrode holder in accordance with the invention enables an electrode held thereby to move in one arcuate path through most of the travel of the electrode and to move in a second arcuate path as the electrode approaches the workpiece. The center of the second arcuate path is on a line substantially perpendicular to the axes of the electrodes when engaging the workpiece and the line symmetrically extends between the electrode tips to assure that the electrodes move substantially coaxially when engaging the workpiece. The center of the second arcuate path is also the center of any arcuate movement of the other electrode holder. This assures precise alignment of the electrodes as they engage the workpiece under high pressure.

The compound electrode holder with the two arcuate paths enables the apparatus to consume less height and to be substantially lighter in weight than those heretofore known, so that the apparatus can have a degree of portability. The design of the apparatus also enables laminated shunts or cables to be short. The travel path of the electrode holders and the environment are also known, as determined by the apparatus design, which results in the position, type of loop, length, and proximity to magnetic materials, all of which affect the reactance and impedance of the secondary loop, to be known. Thus, the amount of electrical energy supplied at the primary end of the welding supply or transformer for a given amount of power at the electrodes can be determined. Lower secondary voltage can be used to achieve the same secondary current as with the previous apparatus. The use of lower secondary voltage also reduces or eliminates expulsion-material being welded or portions of the electrodes being blown away by excess voltage at the start of the resistance weld.

It is, therefore, a principal object of the invention to provide resistance welding apparatus with a compound electrode holder capable of effectively welding workpieces requiring a long electrode travel or stroke.

Another object of the invention is to provide resistance welding apparatus capable of effectively welding workpieces having deep U-shaped cross sections.

A further object of the invention is to provide resistance welding apparatus with a compound electrode holder having a large radius stroke and a shorter radius stroke, the latter being located on a center which is on a line perpendicular to the axes of the electrodes when substantially engaged with the workpiece and symmetrically extending between the tips of the electrodes when so engaged.

Many other objects and advantages of the invention will be apparent from the following detailed description of a preferred embodiment thereof, reference being made to the accompanying drawings, in which.

Figure 1:
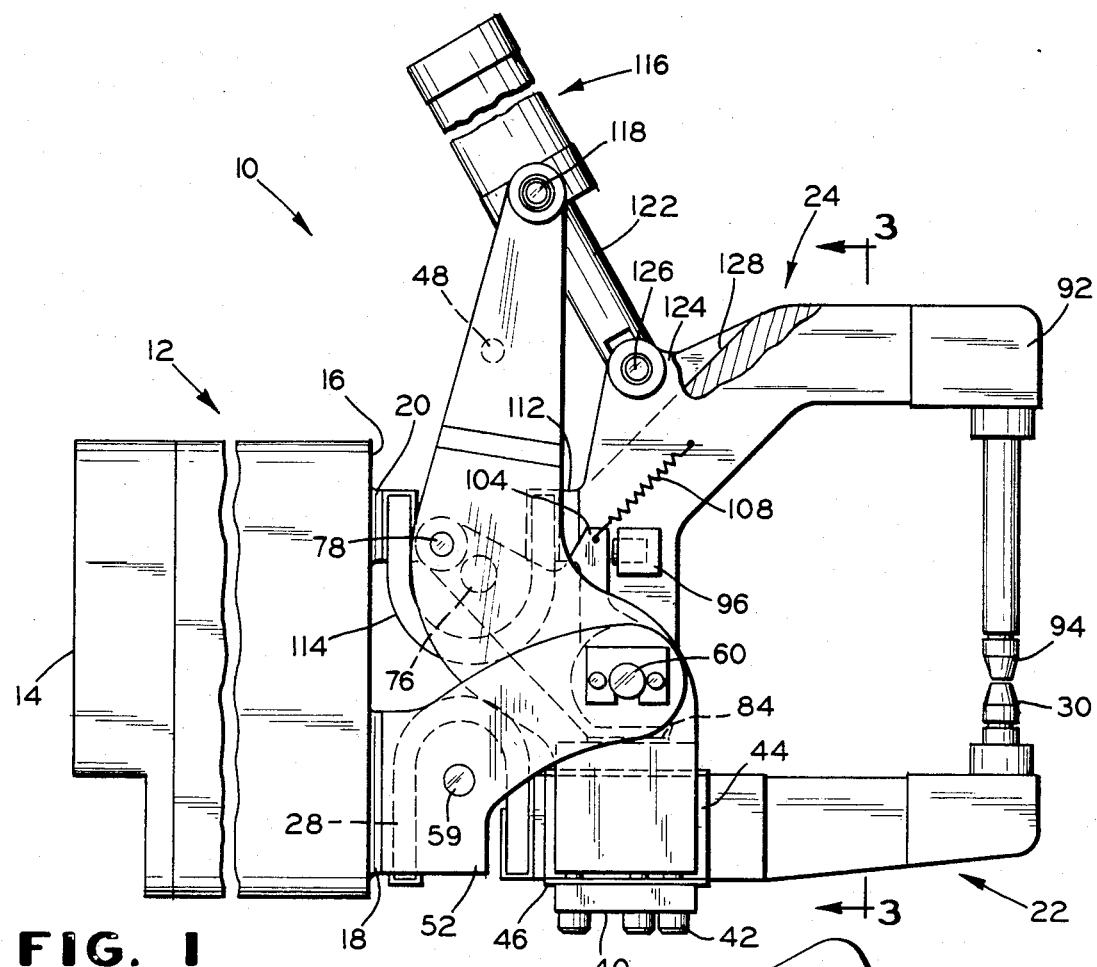
FIG. 1 is a fragmentary, side view in elevation of welding apparatus embodying the invention, in a welding position.

Referring to the drawings and particularly to FIG. 1, welding apparatus according to the invention is indicated at 10 and includes a power supply shown in the form of a transformer 12 having an input end 14 and an output end 16. The output end 16 has a lower terminal block 18 and an upper terminal block 20. The terminal blocks have threaded holes therein by means of which electrode holders or shunts can be mounted on the terminal blocks by machine screws. The transformer is shown in more detail in my U.S. application Ser. No. 545,477 filed on Oct. 26, 1983, and will not be discussed in further detail. Other power supplies can be employed but the transformer 12 has the advantage of providing some degree of portability and compactness for the overall welding apparatus.

The welding apparatus 10 includes a lower electrode holder 22 and an upper, compound electrode holder 24. The lower electrode holder 22 has a long, heavy shank 26, to a rear end of which is affixed an electrical connector preferably in the form of a laminated shunt 28. The other end of the shunt 28 is electrically connected to the terminal block 18, with both ends affixed by machine screws or the like (not shown). The shunt enables some movement of the electrode holder 22 but at the same time it is short to minimize secondary losses. The outer end of the shank 26 of the electrode holder 22 carries an electrode 30 extending upwardly therefrom.

Figure 3:
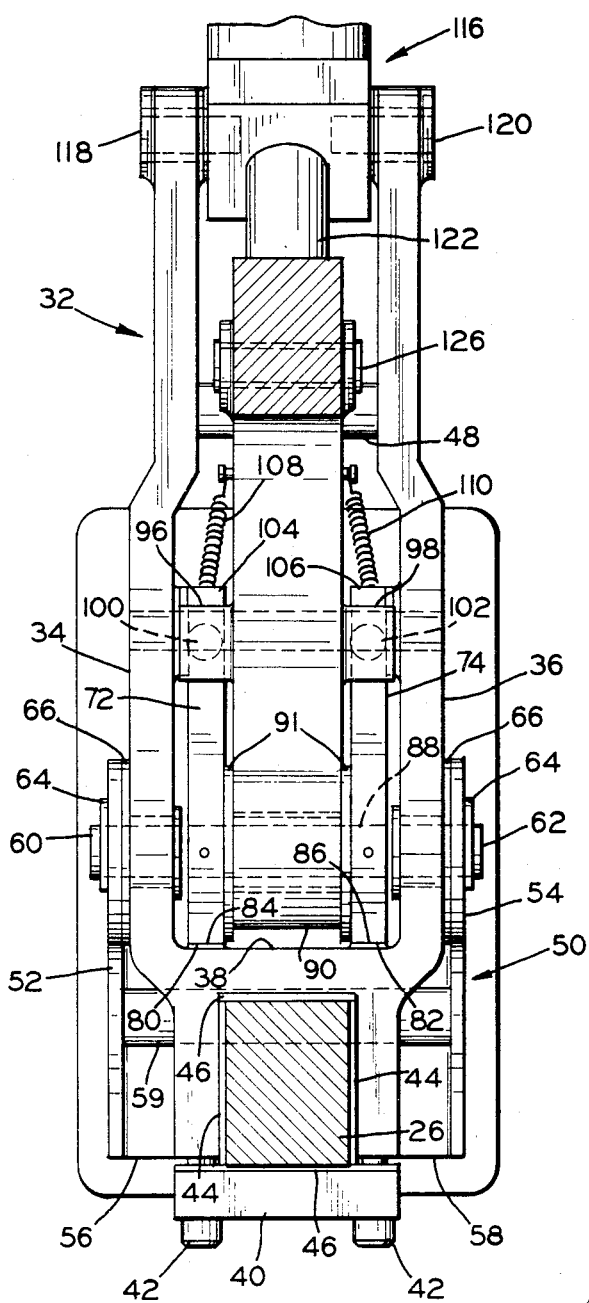
FIG. 3 is a view in section taken along the line 3—3 of FIG. 1.

A main supporting frame 32 extends upwardly from the lower electrode holder 22 at an intermediate portion thereof. The supporting frame 32 includes two spaced side legs 34 and 36, lower ends of which extend on each side of the shank 26 of the lower electrode holder 22. A transverse web extends between the legs 34 and 36 above the shank 26, as best seen in FIG. 3. A clamping plate 40 is fastened to the lower ends of the legs 34 and 36 by machine screws 42 and clamps the frame 32 securely on the lower holder 22 with insulating pads 44 and 46 surrounding the holder. Upper end portions of the legs 34 and 36 are connected by a tie bar or rod 48.

The supporting frame 32 is pivotally supported by the transformer 12 through a bracket 50. The bracket 50 has side arms 52 and 54 with inwardly extending flanges 56 and 58 (FIG. 3) which are also mounted on the lower terminal block 18 by machine screws (not shown). A tie bar or rod 59 extends between the arms. The frame legs 34 and 36 have intermediate portions pivotally connected to outer end portions of the bracket arms 52 and 54 by pivot pins 60 and 62 which are retained by suitable clips 64. Insulating washers 66 are located between the frame legs 34 and 36 and the bracket arms 52 and 54.

The pivot axes of the pivot pins 60 and 62 are precisely located so that they are on a line perpendicular to the axes of the electrodes and which extends symmetrically through the space between tips of the electrodes when they are engaged with the workpiece. This assures that movement of the electrodes will have their axes substantially perpendicular to the workpiece to be welded when engaged with the workpiece.

The compound electrode holder 24 includes a first element 68 and a second element 70. The element 68 has two side plates 72 and 74, upper portions of which are connected by a tie bar or rod 76. The upper ends of the side plates 72 and 74 are connected by a pivot pin 78 to the frame legs 34 and 36 at a position above the pivot pins 60 and 62 and to the rear thereof, near the terminal block 20 of the transformer 12. Lower ends of the side plates 72 and 74 have flat stops 80 and 82 which engage raised stop surfaces 84 and 86 on the transverse web 38 when the element 68 is in its lowest pivotal position.

Lower ends of the first element 68 are pivotally connected by a pivot pin 88 to a lower enlarged end 90 of the second holder element 70 with insulating bushings 91 therebetween. The pivot pin 88 is positioned such that it is coaxial with the axes of the pins 60 and 62 when the stops 80 and 82 engage the stop surfaces 84 and 86. Further pivotal movement of the second element 70 toward the first electrode holder 22 is then in an arcuate path having the same radius and center as the electrode holder 22. An outer, upper end 92 of the holder element 70 carries a long electrode 94. Like the axes of the pivot pins 60 and 62, the axis of the pivot pin 88 is on a line substantially perpendicular to the axes of the electrodes when engaged with the workpiece and the line also symmetrically extends through the space between tips of the electrodes.

An intermediate portion of the element 70 has outwardly extending ears 96 and 98 carrying insulating stops 100 and 102 which project rearwardly from the ears. The stops engage projecting tabs 104 and 106 on intermediate portions of the side plates 72 and 74 of the first element 68 when the second element 70 is raised, so that the first and second elements 68 and 70 then move as a unit. The electrode 94 then travels in an arcuate path with a radius having its center at the axis of the pivot pin 78.

Figure 2:
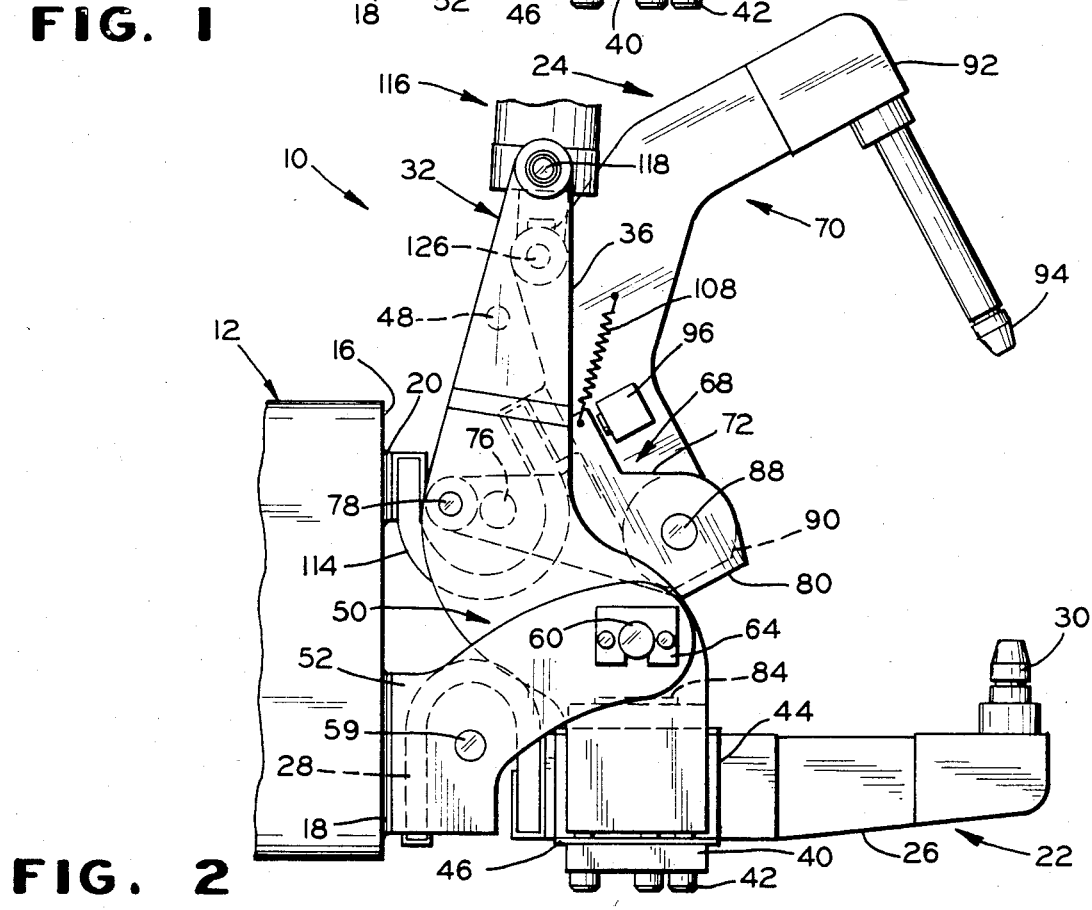
FIG. 2 is a fragmentary side view in elevation similar to FIG. 1, but with the welding apparatus in a retracted position.

Springs 108 and 110 are connected between the first and second elements 68 and 70, specifically between the projecting tabs 104 and 106 and intermediate portions of the element 70. When the second element 70 is then moved toward the first electrode holder 22, as from the position of FIG. 2 toward the position of FIG. 1, the two elements 68 and 70 move as a unit until the stops 80 and 82 engage the stop surfaces 84 and 86. The element 68 then remains stationary while the element 70 moves further toward the electrode holder 22 as the electrode 94 nears and then engages the workpiece. At this time, the path of the electrode 94 is on a radius having its center at the axis of the pivot pin 88 which is also the axes of the pivot pins 60 and 62. This assures that the axes of the electrodes 30 and 94 are substantially perpendicular to the surfaces of the workpiece to be welded and move on a common arcuate path. The electrodes thereby engage the workpiece on a common axis and there is no tendency for the tips of the electrode to push or pull relative to the workpiece as can occur if the electrodes move about separate centers or a center which is other than on a line perpendicular to the electrode axes and symmetrical with respect to the space between the tips of the electrodes.

The second element 70 has a rearwardly-extending projecting block 112 to which power is supplied by a second laminated shunt 114. One end of the shunt 114 is electrically connected to the block 112 by machine screws (not shown) and the other end of the shunt is connected to the terminal block 20 by similar machine screws or the like. The shunt 114 is located near the pivot pin 78 so that minimal flexing movement of the shunt 114 occurs as the compound electrode holder 24 moves between its extreme positions of FIGS. 1 and 2. Like the shunt 28, the shunt 114 is short to minimize secondary electrical losses.

The compound electrode holder 24 can be moved by various means. However, a fluid-operated cylinder and specifically a pressure intensifier cylinder 116 is preferred. The pressure intensifier cylinder can be of the type shown in my U.S. Pat. No. 4,135,076 issued Jan. 16, 1979, and will not be discussed in detail. The rod end of the cylinder is pivotally connected to upper ends of the main frame legs 34 and 36 by pivot pins 118 and 120. A piston rod 122 has its outer end pivotally connected to ears 124 by a pivot pin 126, the ears being separated by a groove 128 in the second element 70.

Figure 4:
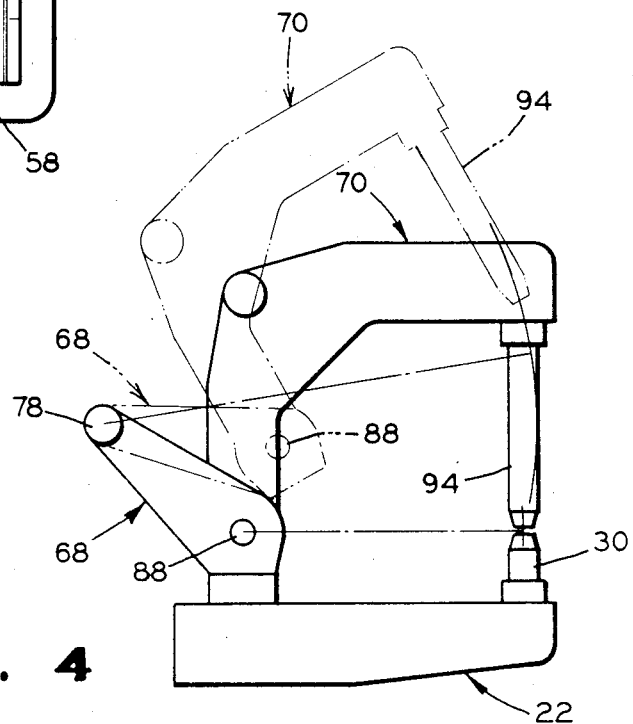
FIG. 4 is a diagrammatic view showing two arcuate paths of movement of an electrode carried by a compound welding electrode of the apparatus.

When the compound electrode holder 24 is in its maximum raised pivotal position, there is ample room between the electrodes 30 and 94 for a workpiece to be placed in welding position. This includes workpieces having deep U-shaped cross-sectional shapes. When the piston rod 122 is extended and the compound electrode holder 24 moves toward the electrode holder 22, the elements 68 and 70 move together with the electrode 94 pivoting in an arcuate path around the pivot pin 78 (see FIG. 4). When the stops 80 and 82 engage the stop surfaces 84 and 86, further extension of the piston rod 122 then causes the electrode 94 to move in a shorter arcuate path with the center being at the axis of the pivot pin 88. Any movement of the electrode 30 likewise is in an arcuate path having a center at the axes of the pivot pins 60 and 62 which are coaxial with the axis of the pivot pin 88. Thus, as the electrodes 30 and 94 are near the workpiece and continue movement to engage the workpiece, the movement is on a common arcuate path with the center of the path being on a line substantially perpendicular to the axes of the electrodes and extending symmetrically through the space between the electrode tips so that the electrodes engage the workpiece with their axes substantially perpendicular thereof. Thus, the high pressure of the electrodes on the workpiece is substantially perpendicular to the workpiece so that there is no pushing or pulling of the electrodes relative to the workpiece.

The large radius of the path or stroke of the electrode 94 throughout most of its length enables the electrode 94 to clear a workpiece which could not be achieved in many instances if the electrode 94 were moved solely through an arcuate path having its center at the axis of the pivot pin 88. Further, the arcuate path of the electrode holder 24 enables the overall height of the apparatus to be substantially less than with the C-type electrode holders heretofore used. The arcuate path also enables the shunts or cables to be shorter, reducing the tendency to self-destruct due to inductive kick. The shorter cables also produce shorter secondary loops resulting in less electrical losses. The smaller electrical losses enable smaller transformers or other power sources to be employed. Weld quality is also improved since the movement or bend of the shunt or cable is less and minimal variation in the losses in the secondary loop results. Since a smaller power source and less electrical energy are needed and lower secondary voltage can be used, expulsion is also reduced or eliminated. Expulsion occurs when some of the metal or material being welded or portions of the electrodes are blown away by excess voltage at the beginning of the resistance welding cycle.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. Apparatus for resistance welding comprising a transformer having an output face, a first output terminal block at one portion of said face, a second output terminal block at another portion of said face, pivotal supporting means extending outwardly from said transformer, a first electrode holder, means electrically connecting said first electrode holder to said first output terminal block, a main frame connected to said first electrode holder and extending away therefrom, means pivotally connecting said main frame to said pivotal supporting means, a compound electrode holder comprising a first element and a second element, a first electrode having a first axis carried by said first electrode holder, a second electrode having a second axis carried by said second element, said first and second axes being substantially aligned when said electrodes are engaged with a workpiece, means pivotally connecting one portion of said first element with said main frame, means pivotally connecting another portion of said first element to said second element on a pivotal axis which is on a line perpendicular to the axes of said electrodes when engaging a workpiece, with the line passing symmetrically through the space between the electrode tips when engaged with the workpiece and said first element is in a predetermined pivotal position, means electrically connecting said second element to said second output terminal block, stop means between said elements for causing the elements to move together when said second element is moved away from said first electrode holder, said first element having stop means for limiting the extent to which said first element can move toward said first electrode holder, resilient means connected between said first and second elements for enabling said second element to move further toward said first electrode holder when said first element is stopped, and means for moving said second element toward and away from said first electrode holder.

2. Welding apparatus according to claim 1 characterized by said moving means comprising a fluid-operated cylinder pivotally supported by said main frame and having a piston rod pivotally connected to said second element.

3. Welding apparatus according to claim 2 characterized by said fluid-operated cylinder being a pressure intensifier cylinder.

4. Welding apparatus according to claim 1 characterized by the predetermined pivotal position of said first element being the maximum pivotal position thereof toward said first electrode holder.

5. Apparatus according to claim 1 characterized by said means pivotally connecting said main frame to said pivotal supporting means has a pivotal axis which is aligned with the pivotal axis of said pivotal connecting means between said elements when said first element is in the predetermined pivotal position.

6. Welding apparatus according to claim 1 characterized by said pivotal connecting means connecting said first element with said main frame being farther away from said electrodes than said pivotal connecting means between said elements.

7. Welding apparatus according to claim 6 characterized by said pivotal connecting means connecting said first element with said main frame being farther away from said first electrode holder than said pivotal connecting means between said elements.

8. Welding apparatus according to claim 1 characterized by said means electrically connecting said second element to said second output terminal block being a laminated U-shaped shunt.

9. Welding apparatus according to claim 1 characterized by said means electrically connecting said first electrode holder to said first output terminal block being a laminated U-shaped shunt.

10. Apparatus for resistance welding comprising a power supply, a first electrode holder, means electrically connecting said first electrode holder with said power supply, a first electrode having a first axis carried by said first electrode holder, a compound electrode holder comprising a first element and a second element, a second electrode having a second axis carried by said second element, said first and second electrode axes being substantially aligned when said electrodes are engaged with a workpiece, means pivotally supporting one portion of said first element, means pivotally connecting another portion of said first element to said second element, stop means for limiting the extent to which said first element can pivotally move toward said first electrode holder, said pivotal connecting means between said elements having a pivotal axis which, when said first element is in its maximum pivotal position toward said first electrode holder, is on a line substantially perpendicular to the axes of said electrodes when engaged with the workpiece, with the line passing symmetrically through the space between the electrodes when engaged with the workpiece, stop means between said elements for causing said elements to move together when said second element is moved away from said first electrode holder, resilient means connected between said first and second elements for enabling said second element to move further toward said first electrode holder when said first element is stopped, and means for moving said second element toward and away from said first electrode holder.

11. Welding apparatus according to claim 10 characterized by said moving means comprising a fluid-operated cylinder having a piston rod pivotally connected to said second element.

12. Welding apparatus according to claim 10 characterized by means pivotally supporting said first electrode holder on an axis which is aligned with the pivotal axis of said pivotal connecting means between said elements when said first element is in its maximum pivotal position toward said first electrode holder.

13. Welding apparatus according to claim 10 characterized by said means pivotally supporting said first element having a pivotal axis which is farther from said electrodes than said pivotal connecting means between said elements.

14. Welding apparatus according to claim 13 characterized by said axis of said pivotal supporting means for said first element being farther from said first electrode holder than said pivotal connecting means between said elements.

15. Welding apparatus according to claim 10 characterized by said means pivotally supporting said first element having a pivotal axis which is farther from said first electrode holder than said pivotal connecting means between said elements.

16. Apparatus for resistance welding comprising a power supply, a first electrode holder, means electrically connecting said first electrode holder with said power supply, a first electrode having a first axis carried by said first electrode holder, a compound electrode holder comprising a first element and a second element, means electrically connecting said compound electrode holder with the power supply, a second electrode having a second axis carried by said second element, said first and second electrode axes being substantially aligned when said electrodes are in a position to engage a workpiece, means pivotally supporting one portion of said first element, means pivotally connecting another portion of said first element to a portion of said second element spaced from said second electrode, stop means for limiting the extent to which first element can pivotally move toward said first electrode holder, said pivotal connecting means between said elements having a pivotal axis which, when said first element is in its maximum pivotal position toward said first electrode holder, is on a line substantially perpendicular to the axes of said electrodes when in a position to engage the workpiece, with the line passing symmetrically between tips of the electrodes when in the position to engage the workpiece, means for causing said elements to move together when said second element is moved away from the first electrode holder, means connected between said first and second elements for enabling said second element to move further toward said first electrode holder when said first element is in its maximum pivotal position toward said first electrode holder, and means for moving said second element toward and away from said first electrode holder.

17. Welding apparatus according to claim 16 characterized by means pivotally supporting said first electrode holder on an axis which is aligned with the pivotal axis of said pivotal connecting means between said elements when said first element is in its maximum pivotal position toward said first electrode holder.

18. Welding apparatus according to claim 17 characterized by said means electrically connecting said first electrode holder with said power supply comprising a laminated, U-shaped shunt.

19. Welding apparatus according to claim 18 characterized by said means electrically connecting said compound electrode holder with the power supply comprising a laminated, U-shaped shunt connected to said second element and located near said means pivotally supporting the one portion of said first element.

20. Welding apparatus according to claim 16 characterized by said means pivotally supporting said first element having a pivotal axis which is farther from said electrodes than said pivotal connecting means between said elements and which is farther from said first electrode holder than said pivotal connecting means between said elements.

* * * * *